No. 773,967. PATENTED NOV. 1, 1904.
H. NADORFF.
BUNG AND BUSHING AND AIR CONNECTION FOR BARRELS.
APPLICATION FILED JULY 29, 1904.
NO MODEL.
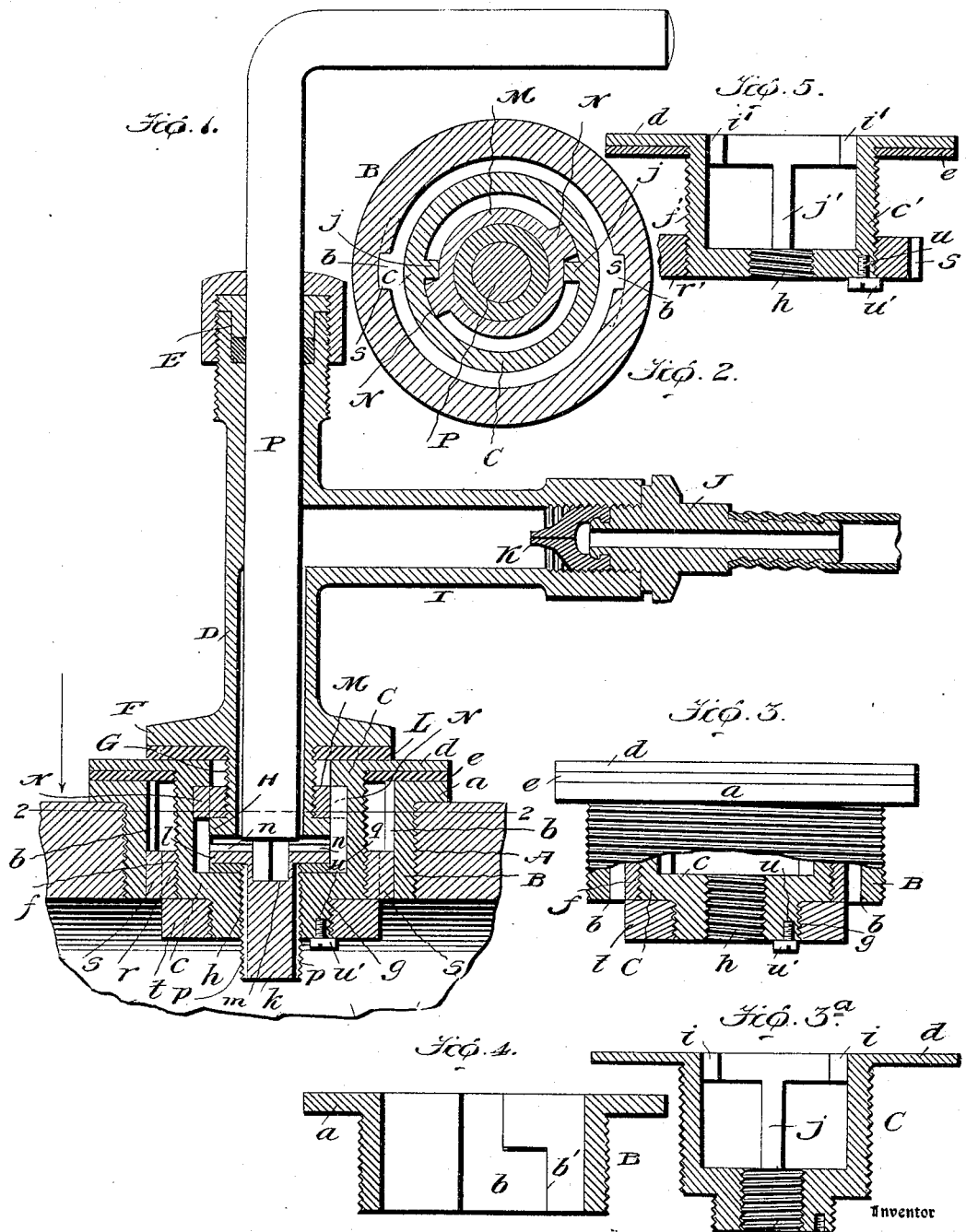
Witnesses
Inventor
Henry Nadorff
Attorney No. 773,967. Patented November 1, 1904.

UNITED STATES PATENT OFFICE.

HENRY NADORFF, OF LOUISVILLE, KENTUCKY.

BUNG AND BUSHING AND AIR CONNECTION FOR BARRELS.

SPECIFICATION forming part of Letters Patent No. 773,967, dated November 1, 1904.

Application filed July 29, 1904. Serial No. 218,749. (No model.)

*To all whom it may concern:*

Be it known that I, HENRY NADORFF, a citizen of the United States, residing at Louisville, in the county of Jefferson and State of Kentucky, have invented new and useful Improvements in Bung and Bushing and Air Connections for Barrels, of which the following is a specification.

My invention pertains to barrels; and it consists in the peculiar and advantageous bung and bushing and air connection for beer-barrels and the like hereinafter described, and particularly pointed out in the claims appended.

In the accompanying drawings, forming part of this specification, Figure 1 is a view illustrating my improvements, partly in diametrical section and partly in elevation, in proper position relative to a portion of a barrel. Fig. 2 is a detail section through the bung and bushing in the plane indicated by the line 2 2 of Fig. 1 and illustrating the manner in which the sleeve-section of the air connection is connected to the bung. Fig. 3 is a view, partly in side elevation and partly in diametrical section, of the bung. Fig. 3ª is a diametrical section of the bung. Fig. 4 is a diametrical section of the bushing, and Fig. 5 is a diametrical section of a modified bung hereinafter referred to.

Referring by letter to the said drawings, and more particularly to Figs. 1 to 4 thereof, A is a bung-hole in a barrel. B is a bushing screwed into the said hole and having a flange $a$ and also having interior oppositely-disposed bayonet-grooves $b$, Figs. 2 and 4, and C is my novel bung designed to be used in connection with the said bushing. In the present and preferred embodiment of my invention the said bung is formed of metal, and comprises a hollow body $c$, having a flange $d$ at its outer end, between which and the bushing-flange $a$ a gasket $e$ is adapted to be compressed, and also having large and small exteriorly-threaded portions $f$ and $g$ and an inner central interiorly-threaded aperture $h$, opposite notches $i$ in its outer end, and opposite interior webs $j$; a plug $k$, threaded in conformity with the aperture $h$ in body $c$ and arranged in said aperture and having a head or flange $l$ at its upper end and an angular seat $m$ in said upper end and also having radial grooves $n$ in its upper end and grooves $p$ in its side; a gasket $q$, interposed between the head of the plug $k$ and the body $c$; an interiorly-threaded ring $r$, mounted on the comparatively large threaded portion $f$ of the body $c$ and having diametrically opposite lugs $s$ adapted to take into and engage the bayonet-grooves $b$ of the bushing B; a ring $t$, interiorly-threaded and arranged on the comparatively small threaded portion $g$ of the body $c$ and with its perimeter flush with that of the ring $r$, and a retaining device $u$, connected to the body $c$ and arranged to hold the ring $t$ on the threaded portion $g$ of the body $c$. The said retaining device $u$ is preferably a screw let into a screw-tapped aperture in the inner end of the body $c$ and having an elongated head $u'$, as shown in Figs. 1 and 3, adapted in the position shown in Fig. 1 to prevent turning of the ring $t$ off of the portion $g$ of the body $c$ and in the position shown in Fig. 3 to permit of the said ring $t$ being removed from the said portion $g$ of the body $c$. When the ring $t$ is removed from the body $c$, the ring $r$ may obviously be turned on and off of the body portion $f$; but with the said ring $t$ secured in position on the body through the medium of the screw-head $u'$ casual removal of the ring $r$ from the body is precluded. While this is so, the ring $r$ is free to turn on the threaded body portion $f$ between the ring $t$ and the flange $d$ for a purpose which will be presently appreciated.

In virtue of the construction of my novel bushing and bung it will be observed that it is necessary in order to place the latter in the former to register the lugs $s$ of ring $r$ with and pass the same through the grooves $b$ of the bushing, also that it is necessary in order to lock the bung in the bushing to dispose the lugs $s$ of ring $r$ in the horizontal portions of the bayonet-grooves $b$ and then turn the bung until the said lugs $s$ bring up against the inner ends $b'$ of the said bayonet-grooves. When this is done, the ring $r$ will be held against turning in the bushing, and the body $c$ may then be turned inwardly and through the said ring $r$, when, as will be readily observed, the gasket $e$ will be compressed between the flanges $a$ and $d$ of the bushing and bung, respectively, and the bung will be tightly secured in the bushing, with the result that a perfectly-tight closure of the bung-hole A will be effected.

In the modified bung shown in Fig. 5 of the drawings the body $c'$ has but one exteriorly-threaded portion, which is lettered $f'$ and upon which a ring $r'$, exteriorly threaded and provided with opposite lugs $s$, is normally retained by a screw $u$, similar to that before described. Said body $c'$ also has opposite interior webs $j''$ and notches $i''$, which are similar to the webs $j$ and notches $i$, respectively, of the body $c$, before described. The said ring $r'$ is free to move on the threaded body portion $f'$ between the head $u'$ of the screw $u$ and the flange $d$ at the outer end of the body $c'$, and from this it follows that the said modified bung is adapted to be secured in the bushing B in the same manner as the bung shown in Figs. 1, 2, and 3. It will also be observed that the modified bung, Fig. 5, is a simplification of that shown in Figs. 1 to 3, and hence is adapted to be produced at a less cost.

The plug $k$ is comprised in the bung when the said bung is designed to form part of an air connection, which air connection comprises, in addition to the bung equipped with the plug $k$, a sleeve-section D, having a stuffing-box E at its upper end and also having an exterior flange F, a threaded portion G below the flange, and a smaller flange H at the lower end of the threaded portion; an arm I, extending laterally from and formed integral with the sleeve-section; a nipple J, removably secured in the outer end of the arm I and adapted to be connected with a source of compressed air or other suitable fluid-pressure supply; a non-return valve K, arranged on the nipple and within the arm I; a gasket L, surrounding the threaded portion G of the sleeve-section below the flange F; a ring M, mounted on said threaded portion G and having exterior lugs N adapted to pass through the notches $i$ in the bung and bring up against the webs $j$ thereof, and a key P, extending loosely through the sleeve-section D and having an angular inner end adapted to seat in the angular socket $m$ of the bung-plug $k$ after the manner shown in Fig. 1. In virtue of this construction it will be observed that when the sleeve-section D is secured to the bung, as shown in Fig. 1, and key P is turned toward the left to turn the plug $k$ in the same direction air from the source of supply before mentioned will be permitted to pass through the sleeve-section D, the grooves $n$ in plug $k$ between the head of the plug and the bottom of the bung, and through the grooves $p$ of said plug into the barrel. It will also be observed that when the plug is turned down tight, so as to compress the gasket $q$ between its head and the bottom of the bung, the air under pressure will be prevented from gaining access to the barrel. It will further be observed that when the lugs on the ring M of the sleeve-section D are passed through the notches $i$ of the bung and turned so as to bring up against the webs $j$ the said ring will be held against turning, and hence the sleeve-section D will screw down through the same, with the result that the gasket L will be tightly compressed between the flange F and the outer end of the bung, thereby making a perfectly air and gas tight connection between the bung and the sleeve-section. In this connection it will be noticed that when it is desired to disconnect the sleeve-section from the bung the same may be accomplished by simply turning the sleeve-section in the direction opposite to that before mentioned and withdrawing the sleeve-section endwise from the bung.

I have entered into a detailed description of the construction and the relative arrangement of the parts embraced in the present and preferred embodiment of my invention in order to impart a full, clear, and exact understanding of the said embodiment. I do not desire, however, to be understood as confining myself to such specific construction and relative arrangement of parts, as such changes and modifications may be made in practice as fairly fall within the scope of my invention as claimed.

Having described my invention, what I claim, and desire to secure by Letters Patent, is—

1. The combination of a bushing having oppositely-disposed bayonet-grooves in its inner side, and a bung comprising an exteriorly-threaded body, an interiorly-threaded ring mounted on the threaded body and having lugs adapted to enter the bayonet-grooves of the bushing and bring up against walls thereof, and means on the body for retaining the said ring thereon.

2. The combination of a bushing having oppositely-disposed bayonet-grooves in its inner side, and a bung comprising an exteriorly-threaded body, an interiorly-threaded ring mounted on the threaded body and having lugs adapted to enter the bayonet-grooves of the bushing and bring up against walls of said grooves, and a screw let into the inner end of the body and having an elongated head adapted in one position to retain the ring on the body, and in another position to permit of removal of the ring from the body.

3. The combination of a bushing having oppositely-disposed bayonet-grooves in its inner side, and a bung comprising a body having large and small exterior-threaded portions, a ring mounted on the large threaded portion of the body and having a thread engaging the thread of said portion, and also having lugs adapted to enter the grooves of the bushing and bring up against walls of said grooves, an interiorly-threaded ring mounted on the small threaded portion of the body and arranged with its perimeter flush with that of the first-mentioned ring, and means on the body for detachably securing the second-mentioned ring thereon.

4. The combination of a bushing, and a bung comprising an exteriorly-threaded body, an interiorly-threaded ring mounted on the threaded body, and means on the body for holding the ring against displacement therefrom; the said bushing and the ring of the bung being provided with means whereby a bayonet connection may be effected between the two.

5. The combination of a bushing, and a bung comprising a body having large and small exterior-threaded portions, a ring mounted on the large threaded portion of the body, and having a thread engaging the thread of said portion, an interiorly-threaded ring mounted on the small threaded portion of the body and arranged with its perimeter flush with that of the first-mentioned ring, and means carried by the body for detachably securing the second-mentioned ring thereon; the bushing and the first-mentioned ring of the bung being provided with coacting means whereby a bayonet connection may be effected between the two.

6. In an air connection for beer-barrels and the like, the combination of a bushing, a bung comprising an exteriorly-threaded hollow body having a threaded aperture in its inner end, and also having notches in its outer end and interior webs, an interiorly-threaded ring mounted on the threaded body, means on the body for holding the ring against displacement therefrom, and a threaded plug occupying the threaded aperture in the inner end of the body and having grooves for the passage of air, and also having an angular socket in its outer end; the said bushing and the ring of the bung being provided with coacting means for effecting a bayonet connection between the two, a sleeve-section having a lateral arm adapted to be connected with a source of fluid-pressure supply, and also having an exteriorly-threaded lower portion, an interiorly-threaded ring mounted on said threaded portion of the sleeve-section and having lugs adapted to pass through the notches in the outer end of the bung-body and bring up against the webs in said body, and a key arranged in the sleeve-section and having an angular inner end arranged in the socket of the plug in the bung.

In testimony whereof I have hereunto set my hand in presence of two subscribing witnesses.

HENRY NADORFF.

Witnesses:
   HARRY A. THORP,
   PETER KALBFLEISCH, Jr.